(12) United States Patent
Teodosiu et al.

(10) Patent No.: US 11,362,988 B2
(45) Date of Patent: Jun. 14, 2022

(54) GENERATING MOBILE DEVICE-SPECIFIC IDENTIFIERS ACROSS NATIVE MOBILE APPLICATIONS AND MOBILE BROWSERS

(71) Applicant: CRITEO S.A., Paris (FR)

(72) Inventors: Dan Teodosiu, Boulogne-Billancourt (FR); Bruno Roggeri, Paris (FR)

(73) Assignee: CRITEO S.A., Paris (FR)

( * ) Notice: Subject to any disclaimer, the term of this patent is extended or adjusted under 35 U.S.C. 154(b) by 0 days.

(21) Appl. No.: 16/750,055

(22) Filed: Jan. 23, 2020

(65) Prior Publication Data

US 2020/0162417 A1 May 21, 2020

Related U.S. Application Data

(63) Continuation of application No. 15/836,697, filed on Dec. 8, 2017, now Pat. No. 10,554,616.

(51) Int. Cl.
| | |
|---|---|
| *G06F 15/16* | (2006.01) |
| *H04L 61/50* | (2022.01) |
| *H04W 12/08* | (2021.01) |
| *G06Q 30/06* | (2012.01) |
| *G06Q 30/02* | (2012.01) |
| *H04L 61/4511* | (2022.01) |
| *H04L 69/16* | (2022.01) |
| *H04L 67/02* | (2022.01) |
| *H04L 101/659* | (2022.01) |

(52) U.S. Cl.
CPC ............ *H04L 61/20* (2013.01); *H04W 12/08* (2013.01); *G06Q 30/0267* (2013.01); *G06Q 30/0275* (2013.01); *G06Q 30/0601* (2013.01); *H04L 61/1511* (2013.01); *H04L 61/6059* (2013.01); *H04L 67/02* (2013.01); *H04L 69/16* (2013.01)

(58) Field of Classification Search
CPC .............................. H04L 61/20; H04W 12/08
See application file for complete search history.

(56) References Cited

U.S. PATENT DOCUMENTS

| | | |
|---|---|---|
| 8,302,011 B2 | 10/2012 | Bryar et al. |
| 9,838,376 B1 | 12/2017 | Lander et al. |
| 10,290,017 B2 | 5/2019 | Traasdahl et al. |
| 2006/0161553 A1 | 7/2006 | Woo |
| 2009/0024737 A1 | 1/2009 | Goldspink et al. |
| 2009/0172091 A1 | 7/2009 | Hamel |
| 2010/0094704 A1 | 4/2010 | Subramanian et al. |
| 2011/0125595 A1 | 5/2011 | Neal et al. |
| 2011/0185016 A1 | 7/2011 | Kandasamy et al. |
| 2011/0225637 A1 | 9/2011 | Counterman |

(Continued)

*Primary Examiner* — Yves Dalencourt
(74) *Attorney, Agent, or Firm* — Proskauer Rose LLP

(57) ABSTRACT

Described herein are methods and systems for generating a mobile device-specific identifier usable across native mobile applications and mobile browsers with a unified opt-out mechanism. A mobile device generates a transient identifier for the mobile device and maps the transient identifier to a stable identifier of the mobile device using at least one call to a service endpoint coupled to the mobile device via a communications network. A browser application on the mobile device renders a webpage, the webpage comprising first instructions, executed by the browser application, to retrieve the stable identifier of the mobile device using at least one call to the service endpoint coupled to the mobile device via a communications network.

26 Claims, 9 Drawing Sheets

(56) References Cited

U.S. PATENT DOCUMENTS

| | | |
|---|---|---|
| 2012/0022942 A1 | 1/2012 | Holloway et al. |
| 2012/0023547 A1 | 1/2012 | Maxson et al. |
| 2012/0297062 A1 | 11/2012 | Lu et al. |
| 2013/0145022 A1 | 6/2013 | Srivastava et al. |
| 2013/0185412 A1* | 7/2013 | Orr ........................ H04L 63/104 709/224 |
| 2013/0275195 A1 | 10/2013 | Gabryelski et al. |
| 2013/0159413 A1 | 11/2013 | Davis et al. |
| 2013/0325607 A1* | 12/2013 | Delug ..................... G06Q 30/02 705/14.53 |
| 2013/0339139 A1 | 12/2013 | Meyers et al. |
| 2014/0164111 A1 | 6/2014 | Rodriguez et al. |
| 2014/0223462 A1 | 8/2014 | Aimone et al. |
| 2014/0316902 A1 | 10/2014 | Le Jouan |
| 2014/0365304 A1 | 12/2014 | Showers et al. |
| 2015/0051968 A1 | 2/2015 | Sotelo et al. |
| 2015/0052217 A1 | 2/2015 | Benguerah et al. |
| 2015/0058141 A1 | 2/2015 | Yablonka et al. |
| 2015/0082345 A1 | 3/2015 | Archer et al. |
| 2015/0134459 A1 | 5/2015 | Dipaola |
| 2015/0154650 A1 | 6/2015 | Umeda |
| 2015/0180829 A1 | 6/2015 | Yu |
| 2015/0181311 A1 | 6/2015 | Navin et al. |
| 2015/0235275 A1 | 8/2015 | Shah et al. |
| 2015/0324857 A1 | 11/2015 | Siegel et al. |
| 2015/0370814 A1 | 12/2015 | Liodden et al. |
| 2015/0379554 A1 | 12/2015 | Copeland |
| 2016/0098785 A1 | 4/2016 | Ishida |
| 2016/0125471 A1 | 5/2016 | Hsu et al. |
| 2016/0182657 A1 | 6/2016 | Mukherjee et al. |
| 2016/0234203 A1 | 8/2016 | Gatto et al. |
| 2017/0085522 A1 | 3/2017 | Greene |
| 2017/0154366 A1 | 6/2017 | Turgeman |
| 2017/0180797 A1 | 6/2017 | Splaine et al. |
| 2017/0318008 A1 | 11/2017 | Mead |
| 2017/0337588 A1 | 11/2017 | Chittilappilly et al. |
| 2017/0359337 A1 | 12/2017 | Benguerah et al. |
| 2018/0053216 A1 | 2/2018 | Heyd et al. |
| 2018/0227387 A1 | 8/2018 | Gersons et al. |
| 2018/0351835 A1 | 12/2018 | Williams et al. |
| 2019/0199774 A1* | 6/2019 | Demsey ................. H04L 67/22 |

* cited by examiner

GENERATING MOBILE DEVICE-SPECIFIC IDENTIFIERS ACROSS NATIVE MOBILE APPLICATIONS AND MOBILE BROWSERS

RELATED APPLICATIONS

This application is a continuation of U.S. patent application Ser. No. 15/836,697, filed on Dec. 8, 2017, the entirety of which is incorporated herein by reference.

TECHNICAL FIELD

The subject matter of this application relates generally to methods and apparatuses, including computer program products, for generating a mobile device-specific identifier usable across native mobile applications and mobile browsers—including using the mobile device-specific identifier for a unified retargeting opt-out mechanism.

BACKGROUND

Generally, mobile device targeting and retargeting for ad purposes utilizes two different methodologies in order to identify a mobile device and provide device-specific ads: one for native applications installed on the mobile device and another for websites rendered by a browser application on the mobile device. For native applications, a software module (such as an SDK) embedded in the native application can capture a device-specific identifier (e.g., IDFA in Apple iOS™, AAID for Android™) when sharing of the device-specific identifier is enabled by the user. In order to opt-out of retargeting activity, a user can simply turn off sharing of the device-specific identifier in the settings of the mobile device, and the device is no longer retargetable.

For mobile browsers, websites can drop cookies (e.g., first-party cookies, third-party cookies) to track the user's activity in the browser for retargeting purposes. Recent developments—such as Apple's integration of Intelligent Tracking Prevention (ITP) in the most recent version of its Safari™ mobile browser—are trying to limit retargeting in mobile browsers by blocking or partitioning cookies for domains flagged as "trackers." As a result, when serving browser-based ads, such tracking domains are unable to identify the user or mobile device and its activity history in order to deliver a user- or device-specific ad.

However, these developments also create an asymmetry between the way users can opt-out of tracking for mobile applications and in the mobile browser. As noted above, for native applications, users can switch off their device-specific identifier which will stop targeting in all native applications. No such mechanism exists for the mobile browser. As such, initiatives such as ITP may make it more difficult to implement a reliable in-browser opt-out mechanism for mobile devices.

SUMMARY

Therefore, what is needed are methods and systems to automatically tie the in-browser identity of the mobile device with the device-specific identifier used by native applications, in order to advantageously create a unified retargeting opt-out mechanism that only relies on disabling the device-specific identifier. The techniques described herein overcome several limitations with current retargeting technology, including providing the ability for seamless integration of browser identity with the device-specific identifier, without requiring the ability to drop third-party cookies on certain domains in the browser. In addition, the methods and systems herein improve existing technical operation of the mobile device through the generation of a transient identifier (TID) for the device which is then associated with the device-specific identifier; this allows the browser to retrieve the device-specific identifier and persist it as a locally-stored value (by using, for instance, first-party cookies, or local storage) to both enable integrated retargeting across both native apps and the mobile browser and to provide the unified opt-out mechanism described above.

Generally, the technical solution presented herein is based on a two-step approach:

A transient identifier (TID) is generated for the mobile device that is not based on cookies, but on device fingerprinting. The lifespan of a TID may be short, i.e. TIDs may change when the device wakes up from sleep or switches to a different network interface, such as switching between WiFi and cellular connectivity.

The TIDs are mapped to the device-specific identifier ("Device ID"), such as IDFA on iPhone™ or AAID on Android™-based devices, using one or a combination of: SDK support in native applications on the mobile device; by buying ad displays in the native application; or using a tracking pixel that is called from the native application. Once the TID is mapped to a Device ID, the information can be retrieved in the browser by calling a service endpoint that will retrieve the Device ID based on the TID, and persist it by dropping locally-stored values (such as a first-party cookie, or local storage) on as many domains as possible that are visited by the mobile device in the browser application while the TID remains stable. This activity associates the mobile browser with the Device ID on those visited domains in a persistent manner, for the lifetime of the locally-stored values.

The system can then implement an opt-out mechanism based on the Device ID. For example, the system monitors the appearance of a particular Device ID on real-time bidding platforms (RTBs) for in-app ad inventory, as well as on in-app ad inventory that is managed directly via an SDK. Before showing an ad in the mobile browser, the system can check whether the Device ID has been seen recently, e.g. during the last twenty-four or forty-eight hours. The system then suppresses the ad if the Device ID has not been seen recently. This provides a reliable "eventual opt-out" mechanism for the mobile browser. Also, in order to protect the privacy of users and to limit tracking by third-parties, the locally-stored values dropped by the system contain a salted and encrypted version of the Device ID; these locally-stored values are eventually deleted for devices that have stopped sharing their Device ID and are thus considered to have been opted out.

The invention, in one aspect, features a system for generating a mobile device-specific identifier usable across native mobile applications and mobile browsers. The system includes a mobile device that calls a service endpoint coupled to the mobile device via a communications network and passes a stable identifier as a parameter to the service endpoint. The service endpoint generates a transient identifier for the mobile device and maps the transient identifier to the stable identifier of the mobile device. The mobile device renders a webpage in a browser application, the webpage comprising first instructions, executed by the browser application, to retrieve the stable identifier of the mobile device using at least one call to the service endpoint coupled to the mobile device via the communications network. The mobile device stores the stable identifier of the mobile device in the browser application as a locally-stored value.

The invention, in another aspect, features a computerized method of generating a mobile device-specific identifier usable across native mobile applications and mobile browsers. A mobile device calls a service endpoint coupled to the mobile device via a communications network, and passes a stable identifier as a parameter to the service endpoint. The service endpoint generates a transient identifier for the mobile device and maps the transient identifier to the stable identifier. The mobile device renders a webpage in a browser application, the webpage comprising first instructions, executed by the browser application, to retrieve the stable identifier of the mobile device using at least one call to the service endpoint coupled to the mobile device via a communications network, and to store the stable identifier of the mobile device as a locally-stored value.

Any of the above aspects can include one or more of the following features. In some embodiments, the stable identifier is an iOS™ IDFA. In some embodiments, the stable identifier is an Android™ AAID. In some embodiments, the retrieved stable identifier is based at least in part on the locally-stored value in the browser application.

In some embodiments, the webpage contains second instructions to track user activity based on the retrieved stable identifier. In some embodiments, tracking user activity comprises capturing one or more attributes associated with user activity on a web site in the browser application. In some embodiments, user activity comprises one or more of: a visit to a product webpage, a search for a product, a visit to a category webpage, an add-to-cart action, or a completion of a transaction. In some embodiments, the website is an ecommerce retailer web site.

In some embodiments, the webpage contains third instructions to identify the mobile device to an ad server or an RTB platform based on the retrieved stable identifier, as part of a bid request associated with at least one ad impression opportunity.

In some embodiments, generating a transient identifier for the mobile device and mapping the transient identifier to the stable identifier of the mobile device using at least one call to a service endpoint comprises: retrieving, by the mobile device, the stable identifier of the mobile device; establishing, by the mobile device, a connection to the service endpoint; sending, by the mobile device, the stable identifier to the service endpoint; generating, by the service endpoint, the transient identifier; and storing, by the service endpoint, a mapping between the transient identifier and the stable identifier of the mobile device.

In some embodiments, establishing a connection to the service endpoint comprises: establishing, by the mobile device, a TCP connection to the service endpoint; and sending, by the mobile device, an HTTP request (e.g., HTTP GET) over the TCP connection; in an alternate embodiment, other types of HTTP requests (e.g., HTTP POST) may be used. In some embodiments, establishing a connection to the service endpoint comprises establishing, by the mobile device, a TCP connection to the service endpoint, and sending, by the mobile device, an HTTPS request (e.g., HTTPS GET) over the TCP connection; in an alternate embodiment, other types of HTTPS requests (e.g., HTTPS POST) may be used. In some embodiments, generating the transient identifier by the service endpoint comprises: extracting at least one of TSval or TSecr from TCP timestamp options of at least one TCP packet received from the mobile device over the TCP connection; and generating the transient identifier using at least one of TSval, TSecr, a clock time associated with the service endpoint, and a source IP address of the TCP connection. In some embodiments, the service endpoint determines a latency associated with the TCP connection using TSecr and the clock time of the service endpoint, and generates the transient identifier using a concatenation of (i) the source IP address and (ii) a difference between the clock time of the service endpoint, TSval, and the latency associated with the TCP connection.

In some embodiments, generating the transient identifier by the service endpoint comprises identifying the source IPv6 address of the TCP connection, and generating the transient identifier using the source IPv6 address. In some embodiments, the service endpoint identifies the source IP address of the TCP connection, determines that the identified source IP address is included in a blacklist, and discards one or more requests for a transient identifier that are associated with the identified source IP address. In one embodiment, the blacklist contains IP addresses that generate substantial amounts of traffic with the same transient identifiers. In some embodiments, the IP addresses correspond to proxies or to fraudulent traffic.

In some embodiments, the service endpoint allocates the transient identifier to one of a plurality of buckets to generate an updated transient identifier. In some embodiments, the mobile device combines the transient identifier received from the service endpoint with one or more data elements associated with the mobile device. In some embodiments, allocation to one of a plurality of buckets is achieved by dividing a value range of the transient identifier into a number of equally-sized intervals, and computing a floor of the transient identifier divided by the size of an interval. In some embodiments, the number of buckets is 4096.

In some embodiments, retrieving the stable identifier of the mobile device using at least one call to the service endpoint comprises: establishing, by the mobile device, a connection to the service endpoint; generating, by the service endpoint, a first transient identifier; retrieving, by the service endpoint, the stable identifier of the mobile device, using a mapping between the first transient identifier and the stable identifier of the mobile device; and sending, by the service endpoint to the mobile device, the stable identifier of the mobile device.

In some embodiments, generating a transient identifier for the mobile device and mapping the transient identifier to the stable identifier of the mobile device using at least one call to a service endpoint comprises: establishing, by the mobile device, a plurality of connections to a second service endpoint, each connection on a different subdomain, wherein when establishing the plurality of connections, the mobile device performs Domain Name System (DNS) resolution on each different subdomain to generate an IP address for the subdomain; generating, for each DNS resolution, by a DNS server associated to each different subdomain, an IP address for the associated subdomain comprising a random subset of bits; extracting and returning, by the second service endpoint, the random subset of bits for each of the plurality of connections; generating, by the mobile device, the transient identifier using at least one of the returned random subsets of bits from each DNS resolution; retrieving, by the mobile device, the stable identifier of the mobile device; establishing, by the mobile device, a connection to the service endpoint; sending, by the mobile device, the stable identifier of the mobile device and the transient identifier to the service endpoint; and storing, by the service endpoint, a mapping between the transient identifier and the stable identifier of the mobile device.

In some embodiments, generating the transient identifier using each of the random subsets of bits from each DNS resolution comprises: identifying, by the second service endpoint for each connection, the IP address on which the second service endpoint is called; extracting, by the second service endpoint for each connection, the random subset of bits from the IP address; transmitting, by the second service endpoint for each connection, the random subset of bits to the mobile device; and concatenating, by the mobile device, each of the random subsets of bits received from the second service endpoint to generate the transient identifier.

In some embodiments, the first service endpoint and the second service endpoint are the same. In some embodiments, the plurality of connections to the second service endpoint is initiated by the mobile device. In some embodiments, a first of the plurality of connections to the second service endpoint is initiated by the mobile device and the rest of the plurality of connections to the second service endpoint is controlled by the second service endpoint via redirects.

In some embodiments, generating the transient identifier using each of the random subsets of bits from each DNS resolution comprises: identifying, by the second service endpoint for a first connection of the plurality of connections, the IP address on which the second service endpoint is called; extracting, by the second service endpoint for the first connection, the random subset of bits from the IP address; extracting, by the second service endpoint for each connection, the random subset of bits from the IP address; transmitting, by the second service endpoint for each connection, the random subset of bits to the mobile device; and concatenating, by the mobile device, each of the random subsets of bits received from the second service endpoint to generate the transient identifier. In some embodiments, generating a transient identifier for the mobile device and mapping the transient identifier to the stable identifier of the mobile device using at least one call to a service endpoint comprises: establishing, by the mobile device, a plurality of connections to a second service endpoint, each connection on a different subdomain, wherein when establishing the plurality of connections, the mobile device performs Domain Name System (DNS) resolution on each different subdomain to generate an IP address for the subdomain; generating, for each DNS resolution, by a DNS server associated to each different subdomain, an IP address for the associated subdomain comprising a random subset of bits; extracting, by the second service endpoint for the first connection, the random subset of bits from the IP address; redirecting, by the second service endpoint, to each of the other plurality of connections on a different subdomain sequentially, wherein on each redirection the second service endpoint passes the extracted random subsets of bits to the redirected connection, extracts the random subset of bits from the IP address of the redirected connection, and concatenates the extracted random subset of bits to the passed extracted random subsets of bits to form a concatenated value that forms a new extracted random subset of bits; using, by the second service endpoint, upon a last redirection, the concatenated value as the generated transient identifier; retrieving, by the mobile device, the stable identifier of the mobile device; establishing, by the mobile device, a connection to the service endpoint; sending, by the mobile device, the stable identifier of the mobile device and the transient identifier to the service endpoint; and storing, by the second service endpoint, a mapping between the transient identifier and the stable identifier of the mobile device In some embodiments, the second service endpoint identifies the source IP address of each of the plurality of connections, determines that one or more of the identified source IP addresses is included in a blacklist, and discards one or more requests that are associated with the identified source IP addresses. In some embodiments, the mobile device stores DNS resolution data comprising a mapping of each subdomain to its corresponding IP address in a DNS cache of the mobile device. In some embodiments, the DNS server associated to each different subdomain sets a time-to-live (TTL) of the DNS resolution data to a predetermined value. In some embodiments, the predetermined value is at least one day.

In some embodiments, the random subset of bits from the IP address for the associated subdomain is at least 8 bits, corresponding to a class C range of IP addresses. In some embodiments, the random subset of bits from the IP address for the associated subdomain is at least 16 bits, corresponding to a class B range of IP addresses.

In some embodiments, the mobile device generates a device-specific identifier for the mobile device; appends the device-specific identifier to each different subdomain to generate device-specific subdomains that are one level deeper than each different subdomain; performs the DNS resolution using the device-specific subdomains; and the DNS server associated to each different subdomain generates, for each DNS resolution using the device-specific subdomain, an IP address for the device-specific subdomain comprising a random subset of bits. In some embodiments, at least one connection between the mobile device and the second service endpoint on a device-specific subdomain is an HTTPS connection. In some embodiments, the mobile device generates a device-specific identifier for the mobile device; performs the DNS resolution using each of the different subdomains; uses the second endpoint to generate a first transient identifier; and appends the device-specific identifier to the first transient identifier to obtain a second transient identifier. In some embodiments, the device-specific identifier for the mobile device is generated based on an IP address of the mobile device. In some embodiments, the device-specific identifier for the mobile device is a hash of an IP address of the mobile device. In some embodiments, the mobile device obtains the IP address of the mobile device by calling a service endpoint that returns a source IP address. In some embodiments, the mobile device combines the transient identifier received from the service endpoint with another transient identifier generated by the mobile device to form an updated transient identifier. In some embodiments, the mobile device combines the generated transient identifier with one or more data elements associated with the mobile device to form an updated transient identifier. In some embodiments, the one or more data elements associated with the mobile device comprise at least one of: a device model, a language setting, or a software version.

In some embodiments, the mapping comprises the transient identifier, the stable identifier, a mapping expiration time, and an identifier of a method used to generate the transient identifier.

In some embodiments, retrieving the stable identifier of the mobile device, using at least one call to the service endpoint comprises: retrieving, by the service endpoint, the transient identifier; determining, by the service endpoint, whether a non-expired mapping exists between the transient identifier and the stable identifier; transmitting, by the service endpoint, the stable identifier to the mobile device if a non-expired mapping exists; and transmitting, by the service endpoint, a null value to the mobile device if no mapping exists or if an expired mapping exists.

In some embodiments, generating a transient identifier for the mobile device and mapping the transient identifier to a stable identifier of the mobile device is initiated by an SDK within a native application installed on the mobile device. In some embodiments, generating a transient identifier for the mobile device and mapping the transient identifier to a stable identifier of the mobile device is initiated upon an occurrence of one or more events detected by the SDK at the mobile device. In some embodiments, the one or more events comprise a reboot of the mobile device, a waking from sleep of the mobile device, a network interface change of the mobile device, a connectivity change of the mobile device, or an elapsing of a predetermined time interval.

In some embodiments, generating a transient identifier for the mobile device and mapping the transient identifier to a stable identifier of the mobile device is initiated by code associated with an ad impression rendered in a native application installed on the mobile device. In some embodiments, the stable identifier is embedded within the code associated with the ad impression and the mobile device extracts the stable identifier for transmission to the service endpoint as part of the call to the service endpoint. In some embodiments, the stable identifier is included in an URL stored in the code associated with the ad impression. In some embodiments, a bid is submitted for the ad impression by an ad server based upon prior activity associated with the stable identifier of the mobile device. In some embodiments, a bid is submitted for the ad impression by an ad server upon receiving a bid request for an ad impression in a native application installed on the mobile device, where the bid request identifies the mobile device via its stable identifier, and the ad server determines that a mapping between the transient identifier and the stable identifier does not exist. In some embodiments, a bid is submitted for the ad impression by an ad server upon receiving a bid request for an ad impression in a native application installed on the mobile device, where the bid request identifies the mobile device via its stable identifier, and the ad server determines that a mapping between the transient identifier and the stable identifier has expired. In some embodiments, a bid is submitted for the ad impression by an ad server upon receiving a bid request for an ad impression in a native application installed on the mobile device, where the bid request identifies the mobile device via its stable identifier, and the ad server determines that a mapping between the transient identifier and the stable identifier has been invalidated by a change in network connectivity for the mobile device.

In some embodiments, generating a transient identifier for the mobile device and mapping the transient identifier to a stable identifier of the mobile device is initiated by a pixel called from a native application installed on the mobile device.

In some embodiments, executing the first instructions to retrieve the stable identifier of the mobile device comprises: identifying, by the browser application executing the first instructions, a locally-stored value that includes a first stable identifier on the domain of the webpage and extracting the first stable identifier from the locally-stored value; calling, by the browser application executing the first instructions, the service endpoint, and passing the first stable identifier as an argument; generating, by the service endpoint, a transient identifier; determining, by the service endpoint, a second stable identifier of the mobile device using one or more of the transient identifier, the first stable identifier, and a mapping between the transient identifier and a third stable identifier; receiving, by the browser application executing the first instructions, the second stable identifier from the service endpoint; and storing, by the browser application executing the first instructions, the second stable identifier in a locally-stored value. In some embodiments, the service endpoint updates a mapping between the transient identifier and the third stable identifier using the received first stable identifier. In some embodiments, the locally-stored value is in one or more of: a first-party cookie, a third-party cookie, a partitioned third-party cookie, a browser cache, a partitioned browser cache, or a local storage.

In some embodiments, when a locally-stored value that includes the first stable identifier is not identified, the browser application, executing the first instructions, sets the first stable identifier to a null value. In some embodiments, when the second stable identifier received from the service endpoint is a null value, the browser application, executing the first instructions, clears the locally-stored value that includes the first stable identifier. In some embodiments, when the second stable identifier received from the service endpoint is a non-null value and the locally-stored value that includes the first stable identifier is not identified, the browser application, executing the first instructions, sets the locally-stored value that includes the second stable identifier. In some embodiments, when the second stable identifier received from the service endpoint is a non-null value that is different from the first stable identifier, the browser application updates the locally-stored value to include the second stable identifier determined by the service endpoint.

In some embodiments, the stable identifier included in the locally-stored value is an encrypted value derived from the stable identifier. In some embodiments, the service endpoint generates the encrypted value using the second stable identifier, a timestamp, a random salt value, and a secret symmetric encryption key.

In some embodiments, executing the third instructions to identify the mobile device to an ad server or an RTB platform comprises: determining, by the browser application, a locally-stored value that includes the stable identifier; extracting, by the browser application, the stable identifier from the locally-stored value; and passing, by the browser application, the stable identifier to the ad server or the RTB platform. In some embodiments, generating a transient identifier for the mobile device and mapping the transient identifier to a stable identifier of the mobile device using at least one call to a service endpoint coupled to the mobile device comprises determining, by the mobile device, whether sharing of the stable identifier of the mobile device is disabled in the mobile device, and sending, by the mobile device, a null value for the stable identifier of the mobile device when sharing of the stable identifier is disabled in the mobile device.

In some embodiments, retrieving the stable identifier of the mobile device using at least one call to the service endpoint comprises determining whether the service endpoint has a non-expired second mapping between the stable identifier of the mobile device and a timestamp. In some embodiments, the second mapping between the stable identifier of the mobile device and the timestamp expires after a given time. In some embodiments, when the service endpoint does not have a non-expired second mapping between the stable identifier of the mobile device and the timestamp, the service endpoint returns a null value for the stable identifier of the mobile device to the browser application. In some embodiments, the browser application passes a null value for the stable identifier of the mobile device to the ad server or the RTB platform. In some embodiments, the second mapping between the stable identifier of the mobile device and the timestamp expires after 24 hours, 48 hours, or 72 hours.

In some embodiments, a native application on the mobile device generates one or more bid requests associated with one or more ad impressions in the native application, the one or more bid requests including the stable identifier of the mobile device, where the one or more bid requests are processed by an ad server or an RTB platform and sent to at least one second remote computing device, where the at least one second remote computing device extracts the stable identifier from the one or more bid requests, and where the at least one second remote computing device updates the second mapping between the stable identifier of the mobile device and the timestamp with the current time. In some embodiments, updating the second mapping between the stable identifier of the mobile device and the timestamp comprises creating the second mapping between the stable identifier of the mobile device and the timestamp if the second mapping does not exist, or changing the timestamp to the current time if the second mapping exists.

The invention, in another aspect, features a system for opting out of ad retargeting in a browser application of a mobile device. The system includes a browser application of a mobile device that renders a webpage. The webpage includes first instructions, executed by the browser application, to retrieve a stable identifier of the mobile device, determine, based upon the retrieved stable identifier, whether sharing of the device identifier is disabled in the mobile device, and identify the mobile device to an ad server or an RTB platform based on the retrieved stable identifier, as part of a bid request associated with at least one ad impression, when sharing of the device identifier is not disabled in the mobile device.

The above aspect can include one or more of the following features. In some embodiments, the stable identifier and the device identifier are the same. In some embodiments, the stable identifier is an Apple™ IDFA. In some embodiments, the stable identifier is an Android™ AAID. In some embodiments, retrieving a stable identifier of the mobile device comprises retrieving the stable identifier from a locally-stored value. In some embodiments, the locally-stored value comprises a first-party cookie, a third-party cookie, a browser cache, or local storage. In some embodiments, when sharing of the device identifier is disabled in the mobile device, retrieving a stable identifier of a mobile device returns a null value for the stable identifier of the mobile device. In some embodiments, when sharing of the device identifier is disabled in the mobile device, the mobile device clears the locally-stored value that includes the stable identifier of the mobile device.

In some embodiments, retrieving a stable identifier of the mobile device comprises retrieving the stable identifier using at least one call to a service endpoint coupled to the mobile device via a communications network. In some embodiments, retrieving a stable identifier of the mobile device using at least one call to a service endpoint comprises: generating, by the service endpoint, a transient identifier for the mobile device; determining, by the service endpoint, the stable identifier of the mobile device by using a mapping between the transient identifier and the stable identifier of the mobile device; determining, by the service endpoint, whether sharing of the device identifier is disabled in the mobile device by using a second mapping; and if sharing of the device identifier in the mobile device is disabled, returning a null value for the stable identifier from the at least one call to a service endpoint.

In some embodiments, determining whether sharing of the device identifier is disabled in the mobile device comprises calling a service endpoint to check a second mapping between the device identifier and a timestamp. In some embodiments, sharing of the device identifier is determined to be disabled in the mobile device when the timestamp, in the second mapping between the stable identifier and a timestamp, is older than a defined time period. In some embodiments, the defined time period is 24 hours, 48 hours, or 72 hours.

In some embodiments, a native application on the mobile device generates one or more bid requests associated with one or more ad impressions in the native application, the one or more bid requests including the stable identifier of the mobile device; wherein the one or more bid requests are processed by an ad server or an RTB platform and sent to at least one second remote computing device; wherein the at least one second remote computing device extracts the stable identifier from the one or more bid requests; and where the at least one second remote computing device updates the second mapping between the stable identifier of the mobile device and the timestamp with the current time. In some embodiments, a pixel called from a native application installed on the mobile device generates a request to a service endpoint implemented by at least one second remote computing device, the request comprising the stable identifier of the mobile device; wherein the at least one second remote computing device extracts the stable identifier from the request; and wherein the at least one second remote computing device updates the second mapping between the stable identifier of the mobile device and the timestamp with the current time. In some embodiments, an SDK within a native application on the mobile device generates one or more bid requests associated with one or more ad impressions in the native application, the one or more bid requests including the stable identifier of the mobile device; wherein the one or more bid requests are processed by an ad server or an RTB platform and sent to at least one second remote computing device; where the at least one second remote computing device extracts the stable identifier from the one or more bid request; and where the at least one second remote computing device updates the second mapping between the stable identifier of the mobile device and the timestamp with the current time.

In some embodiments, when sharing of the device identifier is disabled in the mobile device, the mobile device clears locally-stored values that include the stable identifier of the mobile device. In some embodiments, the locally-stored values are in one or more of: a first-party cookie, a third-party cookie, a partitioned third-party cookie, a browser cache, a partitioned browser cache, or a local storage.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
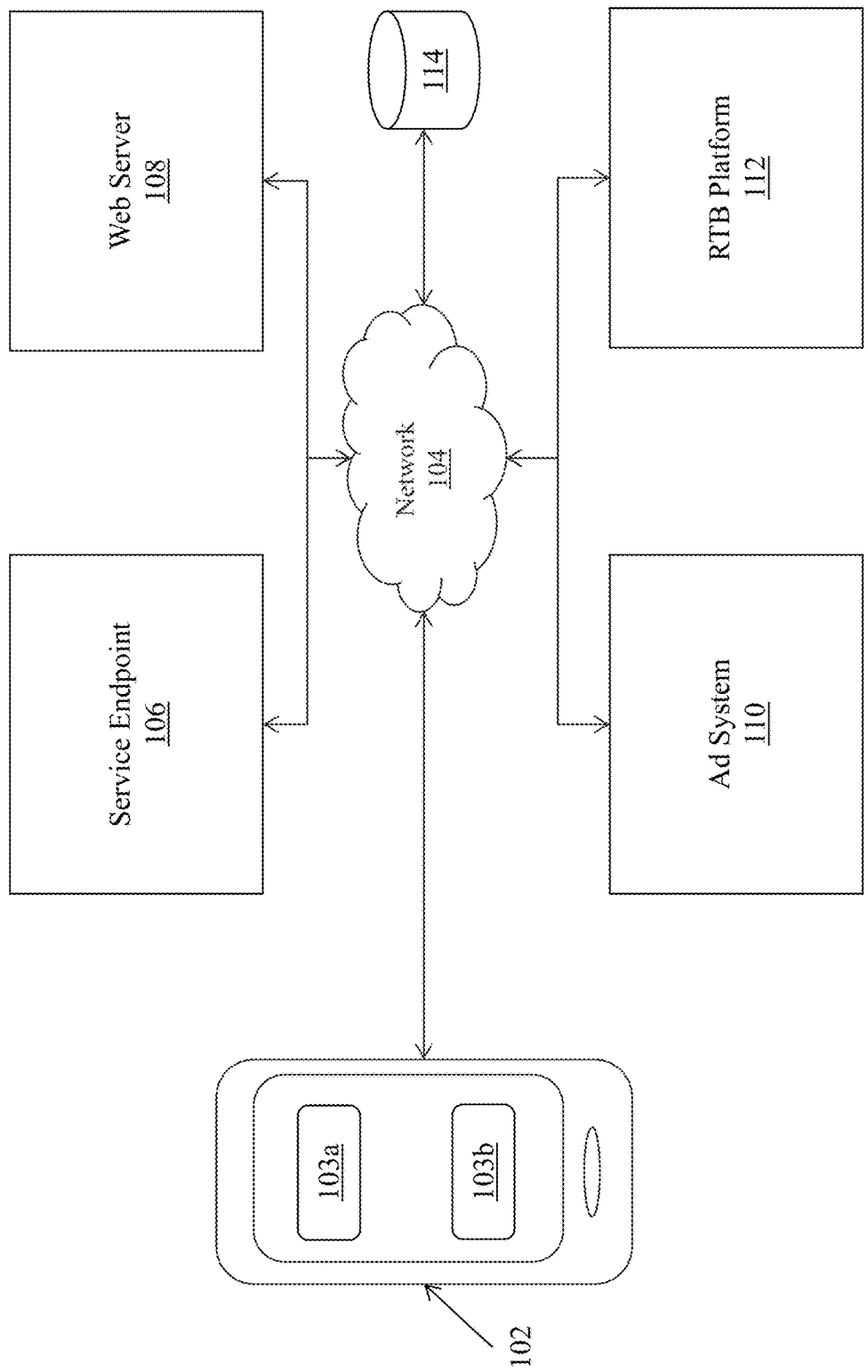
FIG. 1 is a block diagram of a system for generating a mobile device-specific identifier usable across native mobile applications and mobile browsers.

FIG. 1 is a block diagram of a system 100 for generating a mobile device-specific identifier usable across native mobile applications and mobile browsers. As illustrated, networked system 100 includes a mobile client computing device 102 that is capable of executing a native application 103a and a browser application 103b. Exemplary mobile devices 102 include, but are not limited to, tablets, smartphones, and smart watches. It should be appreciated that other types of computing devices that are capable of connecting to the components of the system 100 can be used without departing from the scope of invention. Although FIG. 1 depicts a single mobile computing device 102, it should be appreciated that the system 100 can include any number of mobile devices.

The native application 103a is a software application (also called an 'app') that is installed locally on the mobile device 102 and written with programmatic code designed to interact with an operating system that is native to the mobile device 102. Such software is available from, e.g., the Apple® App Store or the Google® Play Store. In some embodiments, the native application 103a includes a software development kit (SDK) module that is executed by a processor of the mobile device 102 to perform functions associated with generating a mobile device-specific identifier usable across native mobile applications and mobile browsers as described herein.

The browser application 103b comprises software executing on a processor of the mobile device 102 that enables the mobile device to communicate via HTTP or HTTPS with remote servers addressable with URLs (e.g., web server 108) to receive website-related content, including one or more webpages, for rendering in the browser application and presentation on a display device coupled to the mobile device 102. Exemplary mobile browser application software includes, but is not limited to, Firefox™, Chrome™, Safari™, and other similar software. The one or more webpages can comprise visual and audio content for display to and interaction with a user. In some embodiments, the one or more webpages can include code for the rendering of ad impressions.

The system 100 also includes a service endpoint 106 which is a combination of hardware, including one or more special-purpose processors and one or more physical memory modules, and specialized software engines that execute on the processor of the service endpoint 106, to receive data from other components of the system 100, transmit data to other components of the system 100, and perform functions relating to generating a mobile device-specific identifier usable across native mobile applications and mobile browsers as described herein. In some embodiments, the service endpoint 106 executes specialized sets of computer software instructions programmed onto a dedicated processor in the service endpoint 106 and can include specifically-designated memory locations and/or registers for executing the specialized computer software instructions. It should be appreciated that, although FIG. 1 depicts a single service endpoint 106, the system 100 can include a plurality of service endpoints to provide the functionality described herein.

The system 100 also includes a web server 108 (e.g., a computing device or devices) that hosts a website, to which the mobile device 102 connects to retrieve and display webpage content. In some embodiments, the website is an e-commerce platform from a retailer selling online goods or services. In some embodiments, the website is an online content platform (e.g., owned and maintained by a publisher) that sells ad impressions or other types of advertising placements (e.g., for ad creatives, audio/video ads, and other content). Typically, the website comprises a plurality of visual and non-visual elements that make up the content transmitted and displayed to a user when, e.g., browser software 103b on the mobile device 102 connects to the web server 106 via a communications network 104 (e.g., Internet) and requests content from the website. The elements of a website include, but are not limited to, webpages (e.g., HTML documents), image files, layouts, color sets, stylesheets, document object models (DOM), tracking elements, instrumentations (e.g., analytics, advertisement display, etc.), metadata, URLs, advertisements, and content (e.g., text, audio, video).

The system 100 also includes an ad system 110 and a real-time bidding (RTB) platform 112, each of which can comprise a server computing device or multiple server computing devices. In some embodiments, ad system 110 can collect behavioral data for a plurality of devices, browsers, and/or applications. In some embodiments, the ad system 110 can receive behavioral data for a plurality of devices, browsers, and/or applications from third-parties. In some embodiments, the ad system 110 can provide graphical display source code for a computerized graphical advertisement display in accordance with the present technology. In some embodiments, ad system 110 is a DSP (Demand-Side Platform) or a retargeting platform.

The RTB platform 112 can perform auctions for advertising display opportunities in online media, such as application content in the native application 103a, or webpages served by web server 108, that are provided to the browser application 103b. For example, ad system 110 can receive bid requests for such advertising opportunities from RTB platform 112 and submit bids to RTB platform 112; if the RTB platform 112 determines that ad system 110 wins the auction, ad system 110 can provide source code or other display data for a computerized graphical advertisement display to fill the advertising display opportunity in a webpage rendered by the browser application 103b or by the native application 103a on the mobile device 102.

The network 104 enables the various devices 102, 106, 108, 110, 112, 114 in the system 100 to communicate with each other in order to perform the process of generating a mobile device-specific identifier usable across native mobile applications and mobile browsers as described herein. The network 104 may be a local network, such as a LAN, and/or a wide area network, such as the Internet and/or a cellular network, and/or a combination of a local network and a wide area network. In some embodiments, the network 104 is comprised of several discrete networks and/or sub-networks (e.g., cellular to Internet) that enable the components of the system 100 to communicate with each other.

The system 110 also includes a database 114. The database 114 is coupled to service endpoint 106 and ad system 110 via the network 104, and stores data used by these components to perform the process of generating a mobile device-specific identifier usable across native mobile applications and mobile browsers as described herein. The database 114 can be integrated with one or more of the computing devices of the system 100, or be located on a separate computing device or devices. An example database that can be used with the system 100 is Couchbase available from Couchbase Inc. of Mountain View, Calif.

Figure 2:
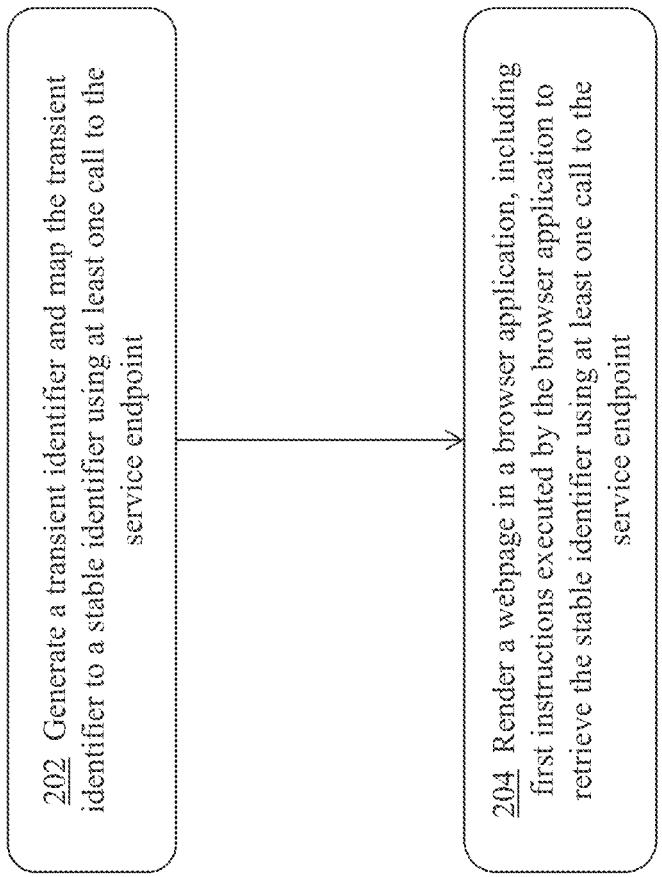
FIG. 2 is a flow diagram of a method of generating a mobile device-specific identifier usable across native mobile applications and mobile browsers.

FIG. 2 is a flow diagram of a method 200 of generating a mobile device-specific identifier usable across native mobile applications and mobile browsers, using the system 100 of FIG. 1. The system 100 generates (202) a transient identifier (TID) for the mobile device 102 and maps the TID to a stable identifier (e.g., Device ID such as IDFA or AAID) of the mobile device 102 using at least one call to the service endpoint 106 coupled to the mobile device 102 via communications network 104. The system 100 renders (204) a webpage in a browser application 103b on the mobile device 102. The webpage includes first instructions (e.g., Javascript code) that are executed by the browser application 103b, to retrieve the stable identifier of the mobile device 102 using at least one call to the service endpoint 106. Further technical details regarding each of these steps 202, 204 are provided below.

Generating a Transient Identifier (TID)

As noted above, the first step is to generate (202) the TID for the mobile device 102. The TIDs need to be sufficiently long-lived to allow an association with the device ID, and to tag websites visited by the browser 103b of the mobile device 102. As presented herein, the system 100 can generate TIDs without using cookies using a variety of device-based fingerprinting techniques, of which three are described below. These fingerprinting techniques can be used in isolation or in combination. Also, other fingerprinting approaches are possible and can be used instead of, or in addition to, the techniques described below.

1) Generating a TID Based Upon DNS Caching

Figure 3:
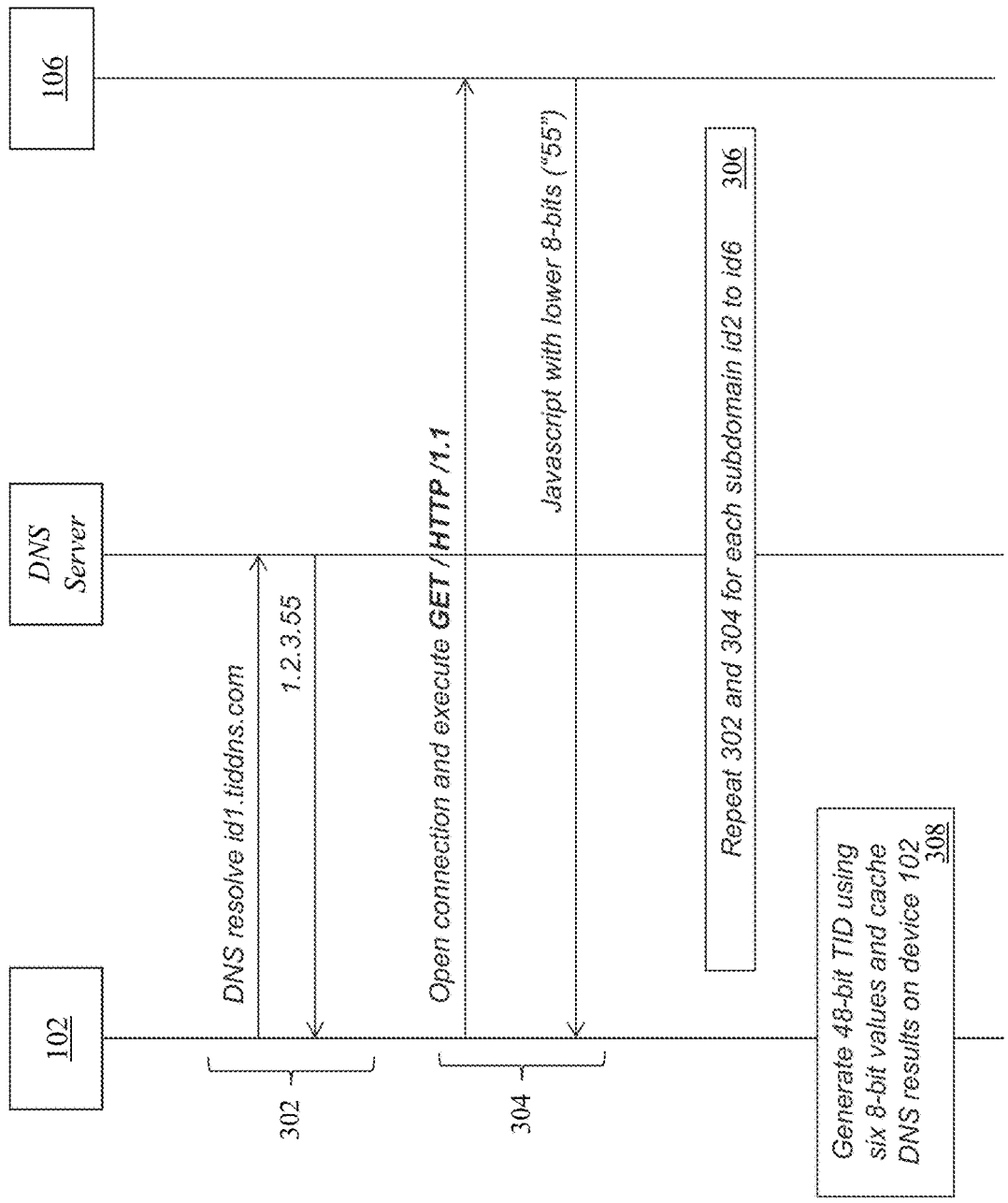
FIG. 3 is a ladder diagram of a method of generating a TID based upon a DNS Caching technique.

FIG. 3 is a ladder diagram 300 of a method of generating a TID based upon a DNS Caching technique, using the system 100 of FIG. 1. In the below example, service endpoint 106 is reachable on one or more subdomains id1.tiddns.com to id6.tiddns.com, a class C range of IP addresses 1.2.3.0 to 1.2.3.255 is used by service endpoint 106, and a DNS server has been set up to return a random (or round-robin) address in this IP range for every lookup on the following subdomains of the service endpoint 106:

id1.tiddns.com
id2.tiddns.com
. . .
id6.tiddns.com

Therefore, when the mobile device 102 performs DNS resolution for the above subdomains, the device 102 may get a result such as:

id1.tiddns.com→1.2.3.55
id2.tiddns.com→1.2.3.201
. . .
id6.tiddns.com→1.2.3.143

These values are illustrative and other values in the range of IP addresses 1.2.3.0 to 1.2.3.255 may be returned by the DNS server.

These lookups occur when the mobile device 102 accesses the service endpoint 106 on these subdomains. For instance, the mobile device 102 can resolve the IP address of id1.tiddns.com (302) as part of opening a connection and sending an HTTP GET request on id1.tiddns.com; in an alternate embodiment, other types of HTTP requests (e.g., HTTP POST) may be used. The native application 103a or the browser 103b of the mobile device 102 first resolves (302) "id1.tiddns.com" to "1.2.3.55," establishes a connection with service endpoint 106 at this IP address, then sends (304) an HTTP GET request to the service endpoint 106. The service endpoint 106, which listens for requests on the entire IP range 1.2.3.0 to 1.2.3.255, returns a snippet of Javascript that communicates back to Javascript code running in the native application 103a or the browser application 103b on the mobile device 102 the lower 8-bits of the IP address (e.g., "55" in the above example). The same service endpoint implementation can be used for all subdomains id1 to id6—i.e., the mobile device 102 repeats (306) the steps 302 and 304 above for each remaining subdomain id2 to id6.

Once the mobile device 102 has called the six endpoints, the device 102 stitches together (308) the six 8-bit values returned by the service endpoint 106 (e.g., "55," "201," . . . , "143" in the example above) to generate a 48-bit TID (e.g., 0x37C9 . . . 8F in this example). On subsequent requests to the service endpoint 106, the mobile device 102 uses the DNS resolution results that have been cached by its operating system. This means that, as long as the DNS cache entries are stable on the device 102, the device 102 calls the endpoints on the same IPs on subsequent calls and thus receives the same results, allowing the device 102 to stitch together the same TID. Because the DNS cache may be used across all applications on the device 102, the same TID can be retrieved both from the native application 103a and from different instances of the mobile browser 103b (such as webviews). This is the case, for instance, in Apple's iOS™.

It should be appreciated that the DNS server should set the time-to-live (TTL) value of the returned A records to a sufficiently high value (e.g., one day) to ensure a sufficient lifetime for the TID. Because the DNS cache of the mobile device 102 may be flushed from time to time (e.g. on Apple's iOS™, whenever the device 102 goes into airplane mode, or whenever it switches between network interfaces), the TTL should be set to a value that is higher than the median time between these types of events.

In an alternate embodiment, a different number of subdomains can be used to generate TIDs of a different length. In an alternate embodiment, the service endpoint 106 can use a class B range of IPs to reduce the number of calls to the service endpoint 106, as each call could generate 16 bits of information; for instance, with a class B range, only three subdomains and three service endpoint calls are needed to generate a 48-bit TID.

a) Avoiding Intermediary DNS Server Caches

Also, the system 100 should avoid intermediary DNS server caches (such as those provided by a mobile carrier or a corporation) as part of the DNS Caching technique. In one example, the DNS lookup from the mobile device 102 does not necessarily go directly to the DNS server for the service endpoint 106. For instance, a carrier/provider/corporation DNS server may sit in between the mobile device 102 and the service endpoint 106. Such intermediate DNS servers also cache the returned A records—which poses a problem if multiple mobile devices go through the same DNS server, as all of these devices may get the same TIDs. To avoid this, the system 100 can generate a stable, device-specific Fingerprint ID (FID) with a sufficient number of bits. The actual cardinality needed depends on how many devices are expected to be sitting behind each DNS cache and an acceptable collision rate. This FID could, for instance, be generated based on the TCP timestamp of the device or the IP address of the device (as described below); additionally, the system 100 can also use e.g. the model, OS version, and language setting of the mobile device 102. Other fingerprinting approaches are possible and can be used instead of, or in addition to, these techniques.

Each device i now generates its own FIDi, and uses it to look up the following device-specific subdomains instead:

FIDi.id1.tiddns.com→1.2.3.55
FIDi.id2.tiddns.com→1.2.3.201
. . .
FIDi.id6.tiddns.com→1.2.3.143

This technique creates different entries, one per device i and device-specific subdomain FIDi.id1.tiddns.com, . . . FIDi.id6.tiddns.com, in all intermediate DNS servers that may be caching the result; therefore, the probability of a collision is reduced, assuming the FIDs are sufficiently unique to differentiate between the mobile devices using the same intermediate DNS server.

In one embodiment, the FID is generated based on the IP address of the mobile device 102. In one embodiment, the FID is a hash of the external IP address of the mobile device 102. In one embodiment, the external IP address of the mobile device 102 is obtained by calling a service endpoint 106 that returns the source IP address of the connection.

In one embodiment, the FID is not prepended to the subdomains id1.tiddns.com . . . id6.tiddns.com of the service endpoint 106 to generate device-specific subdomains; the mobile device 102 performs DNS resolution on these subdomains as described above; stitches together the values to obtain a first TID as described above; and appends a FID to the first TID to generate a second TID. The second TID may be unique even if the first TID is the same across mobile devices 102 sharing the same DNS cache.

b) Avoiding Proxies

In addition, if the mobile device 102 accesses the internet via a proxy (such as a transparent proxy operated by a mobile carrier or a corporation), then the DNS lookups described above may be done by the proxy and not directly by the mobile device. In order to avoid this, the mobile device 102 needs to send the requests to the service endpoint 106 via HTTPS, which bypasses the proxies (at least for transparent proxies). In one implementation, wildcard TLS certificates for \*.id1.tiddns.com . . . \*.id6.tiddns.com need to be installed on the service endpoint 106 to be able to serve requests over HTTPS for subdomains such as:

FIDi.id1.tiddns.com
FIDi.id2.tiddns.com
. . .
FIDi.id6.tiddns.com

This allows the service endpoint 106 to authenticate properly to HTTPS requests on FIDi.idj.tiddns.com.

c) Other DNS Caching Techniques

In some embodiments, the mobile device 102 uses the subdomains initially described:

id1.tiddns.com
id2.tiddns.com
. . .
id6.tiddns.com

But, the resulting TID may not be unique for devices using the same DNS cache, as described above. Uniqueness can be achieved by combining the resulting TID with a second fingerprint TID' (such as the one based on the TCP timestamp approach described below) to form a unique fingerprint (TID, TID') on the mobile device 102.

In an alternate implementation, the mobile device 102 only calls service endpoint 106 on the id1.tiddns.com subdomain. The service endpoint 106 extracts the lower 8-bits of the IP address, then issues an HTTP 302 redirect code that causes a redirect to the id2.tiddns.com subdomain, with the lower 8-bits of the IP address passed as a parameter in the query string of the URL. For instance, the response of the service endpoint 106, when called on the first subdomain, may be the following:

HTTP/1.1 302 Found
Location: http://id2.tiddns.com?id1=55

Similarly, the service endpoint 106, when called on the id2.tiddns.com subdomain, extracts the lower 8-bits of the IP address, then appends this value as a second parameter and redirects to the next subdomain id3.tiddns.com. For instance, the response of the service endpoint 106, when called on the second subdomain, may be the following:

HTTP/1.1 302 Found
Location: http://id3.tiddns.com?id1=55&id2=201

The sequence of redirects continues through each subdomain until the id6.tiddns.com subdomain is redirected to. When called on this subdomain, the service endpoint 106 extracts the lower 8-bits of the IP address, uses the parameters in the query string to assemble the full 48-bit TID, and returns this TID to the mobile device 102 as a snippet of Javascript.

2) Generating a TID Based Upon IPv6 Addresses

Another approach to generating a TID is to use IPv6 addresses. The lower 64-bits of an IPv6 address may be derived from the MAC address of the mobile device 102. To prevent disclosing the MAC address, most modern operating systems implement RFC 4941 (Privacy Extensions)—these devices generate a random 64-bit component and rotate this value once a day (typically).

The system 100 can implement an IPv6-based TID as follows. A service endpoint (e.g., 106) is exposed and accessible over IPv6 on the following domain:

tidv6.com

The mobile device 102 can access this service endpoint, which simply returns the lower 64-bits of the mobile device's IPv6 address. This TID is stable until the mobile device 102 rotates the lower 64-bits in its IPv6 (typically, once a day) or until the mobile device 102 switches to a different network.

3) Generating a TID Based Upon a TCP Timestamp

Figure 4:
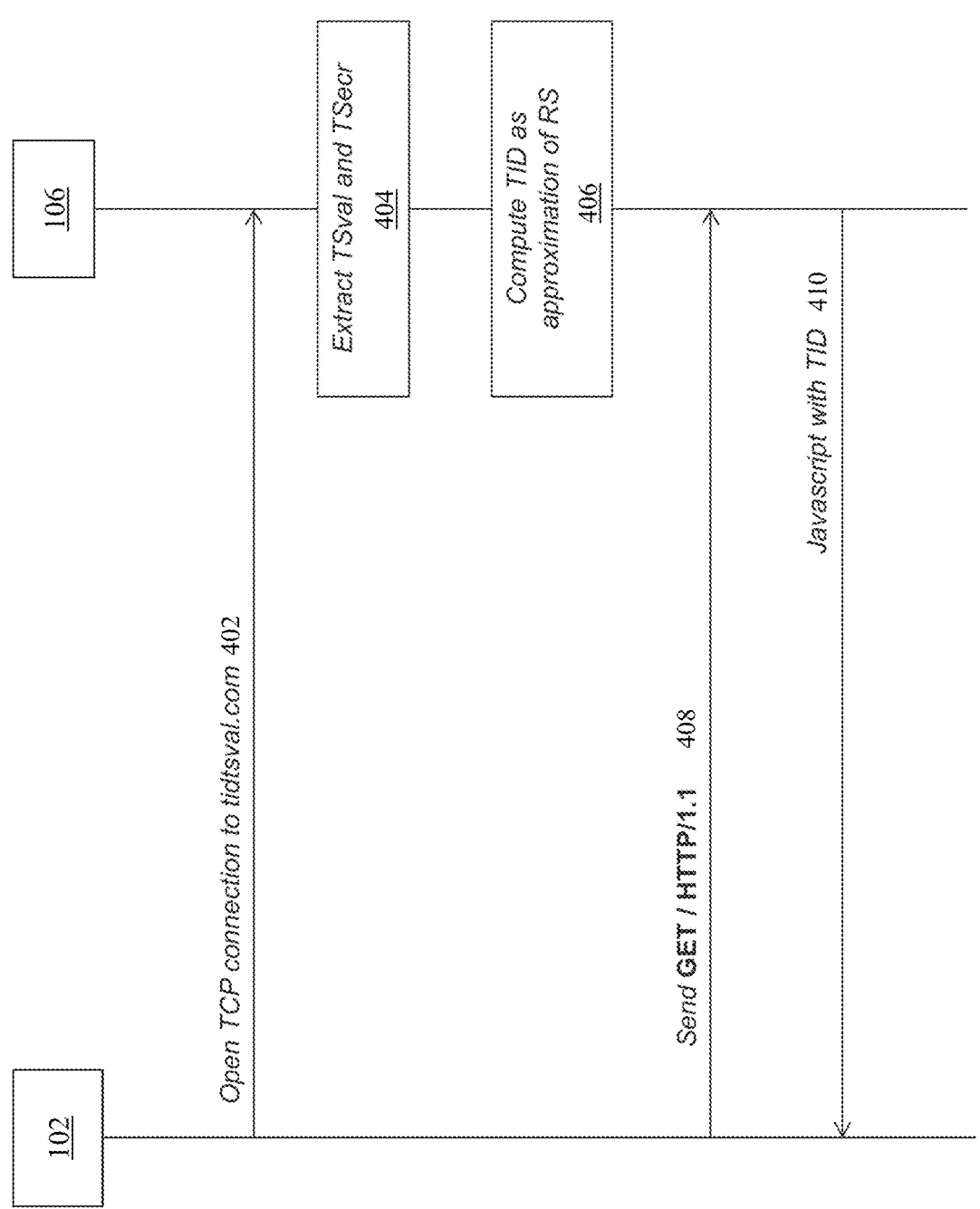
FIG. 4 is a ladder diagram of a method of generating a TID based upon a TCP timestamp technique.

Another approach to generating a TID is to use TCP timestamps. FIG. 4 is a ladder diagram of a method of generating a TID based upon TCP timestamp technique, using the system 100 of FIG. 1.

RFC 1323 and RFC 7323 have defined TCP extensions for high performance. The original purpose of these RFCs is to provide PAWS (Protection Against Wrapped Sequences)

and improve handling of "long, fat networks" (LFNs) by allowing round-trip time measurement (RTTM).

TCP stacks that implement RFC 1323—"TCP Extensions for High Performance (https://www.ietf.org/rfc/rfc1323.txt) and RFC 7323—"TCP Extensions for High Performance" (https://tools.ietf.org/html/rfc7323)—such as the one in Apple's iOS™—include a TCP Timestamp Option (TSopt) in the TCP packets they send. This option carries two fields as its payload: cf. RFC 1323 and RFC 7323 "TCP Extensions for High Performance")

TS Value (TSval): this value monotonically increments with the wall clock time on the mobile device 102. For instance, on Apple's iOS™, TSval is initialized with a random 30-bit seed RS when the device boots up, and the TSval sent is the random seed plus the current device time, measured for the periods during which the mobile device 102 is not sleeping.

TS Echo Reply (TSecr): this echoes the TSval last seen from the other end of the TCP connection. A receiver can use TSecr to compute an approximation of the connection latency L.

Because the TSval is initialized with a random seed (RS) that is unique to an OS instance (boot) on a device, RS or a value derived from it can be used as a TID for the mobile device 102.

To extract this TID, the mobile device 102 calls the service endpoint 106, for instance by performing a GET request on the following domain:

tidtsval.com

The mobile device 102 first opens a TCP connection to tidtsval.com (402). The service endpoint 106 extracts (404) TSval and TSecr from the TCP packets received over the TCP connection, and computes (406) a TID that represents an approximation of the random seed RS. The mobile device 102 sends an HTTP GET request (408) to the service endpoint 106 over the connection. The service endpoint 106 returns (410) the TID (or Javascript code that contains the TID) to the mobile device 102 as the result of the GET. In one embodiment, the service endpoint 106 implements the extraction of TSval and TSecr as code running on a load balancer that inserts these values as part of special headers of the HTTP request forwarded to one of one or more servers. In one implementation, TID can be computed in step 406 as follows:

TID=LoadBalancerWallClockTime−Tsval

Assuming the mobile device clock and the load balancer clock are reasonably synchronized and the drift is low, this provides an approximation of RS that should be stable across multiple calls to the service endpoint 106.

In an alternate implementation, the connection latency may also be used to reduce imprecision due to latency jitter:

TID=LoadBalancerWallClockTime−Tsval−$L$

In an alternate implementation, the system can bucketize the TID values to further reduce noise, and the service endpoint 106 returns the identifier of the bucket, $TID_{bucket}$:

$TID_{bucket}$=Bucketize(TID)

One type of bucketization that works well in practice for iOS™ devices (based upon observation of a large traffic sample) is to subdivide the useful 30-bit range of TID into 4096 buckets, thus to calculate $TID_{bucket}$ by dividing the TID by $2^{18}$ which is the size of a bucket. This can be achieved by simply shifting the TID right by 18 bits:

$TID_{bucket}$=TID>>18

It should be appreciated that other types of bucketization are possible for use with the techniques described herein.

In an alternate implementation, the call from the mobile device 102 to the service endpoint 106 is done over HTTPS in order to circumvent transparent proxies on port 80, such as the ones that may be provided by mobile carriers or corporations.

In an alternate implementation, the service endpoint 106 has a blacklist containing IP addresses. The service endpoint 106 can filter out requests from IP addresses contained in the blacklist to avoid returning the same TID to multiple devices, which would cause TID collisions. In one embodiment, the blacklist contains IP addresses that generate substantial amounts of traffic with the same transient identifiers; corresponding to, e.g., mobile devices behind the same proxy, or fraudulent traffic.

In an alternative implementation, the TID value computed in step 406 by the service endpoint 106 may be associated with the source IP address of the connection established in step 402 to reduce the number of collisions. Using the TID computed via one of the above TCP timestamp approaches, the value $TID_{IP}$ returned by the service endpoint 106 is the concatenation of the TID and the IP address:

$TID_{IP}$=(TID,IP)

This approach helps reduce the number of collisions, as collisions can now only occur between mobile devices sharing the same IP address (such as devices going through the same NAT), not between all the devices on the Internet.

Mapping the Transient Identifier to a Stable Device Identifier

Turning back to FIG. 2, once the system 100 generates TIDs as described above, the system maps (202) these TIDs to a stable device identifier, such as the Device ID described above (i.e., IDFA or AAID). Generally, the system can perform this mapping in several ways as described below; it should be appreciated that these approaches can be used in isolation or in combination with each other:

Using in-app support via an SDK embedded in the native application 103a;

Using a tracking pixel that is called from the native application 103a; and

Using an ad buying platform such as ad system 110 to buy and display an ad impression in the native application 103a.

These approaches use a service endpoint that stores and retrieves the mapping between TID and Device ID; the service endpoint may be called from the native application 103a or from the mobile browser 103b to establish the mapping, and from the mobile browser 103b to retrieve the mapping—as is described in detail below.

In one embodiment, the mapping between TID and Device ID is stored in database 114; in one embodiment, the mapping is accessed by both the service endpoint 106 and ad system 110.

In one embodiment, the service endpoint 106 is providing the service on the following domain:

associate.stableid.com and the service endpoint 106 exposes its functionality over HTTP or HTTPS. In one implementation, this could be implemented as a RESTful API. The service endpoint 106 can be called from either the native application 103a or from the mobile browser 103b in the mobile device 102 using Javascript.

The service endpoint 106 implements the following API:
associate: (TID, DeviceID)→DeviceID'

The service endpoint 106 is called with two parameters: the TID and DeviceID. In some cases, the DeviceID parameter can be null. In some cases, the TID is not passed explicitly, but can be extracted by the service endpoint 106 using one of the methods described above, or using some other fingerprinting method. The service endpoint 106 returns a DeviceID' if a mapping can be established, or null otherwise. In most cases, DeviceID' DeviceID but there are some cases described below where this is not the case. In some implementations, a DeviceID' DeviceID is returned when a potential TID collision is detected.

The service endpoint 106 keeps a mapping between TID and DeviceID. In one implementation, the mapping between TID and DeviceID is stored in database 114; in one implementation, the database 114 is implemented as an in-memory cache such as Redis, memcached, or Couchbase.

When the service endpoint 106 is called with (TID, DeviceID) both non-null, the endpoint 106 updates its mapping table and returns the DeviceID'=DeviceID. Each entry <TID, DeviceID> in the mapping table can have an expiration time after which the entry is automatically deleted. Updating an entry sets a new expiration time. As mentioned above, in some cases, the service endpoint 106 may return DeviceID'≠DeviceID.

When the service endpoint 106 is called with (TID, null), the service endpoint 106 checks whether a non-expired entry <TID, DeviceID> exists in its mapping table. If an entry is found, the service endpoint 106 returns DeviceID'=DeviceID; otherwise, it returns null.

1) Mapping Via in-App Support

In one instance, the system 100 can create the mapping between TID and Device ID using a native application 103*a* installed on the mobile device 102. The native application 103*a* is instrumented with code implementing the functionality described below to facilitate the association between TID and DeviceID. In one implementation, this code is included in a dedicated application 103*a*. In an alternate implementation, the code is contained in an SDK that is included in at least one native application 103*a* installed on the mobile device. In an alternate implementation, the code is executed in an instance of the mobile browser 103*b* created by the native application 103*a*.

The code listens for "interesting" system events that could indicate that the <TID, DeviceID> mapping has changed. These events include, but are not limited to: device reboot; device waking from sleep; device network interface change; certain time interval has elapsed (e.g., periodic refresh); airplane mode has been disabled in the device; or the WiFi connection on the device has been re-enabled.

Figure 5:
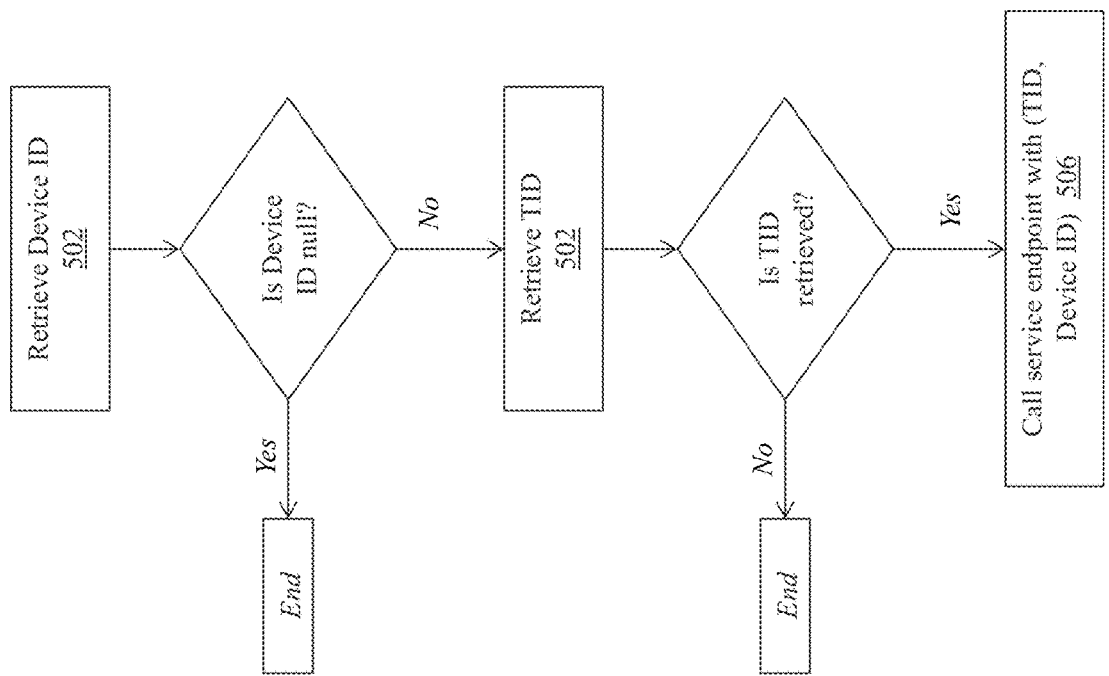
FIG. 5 is a flow diagram of a method of mapping the TID and the DeviceID via a native application on the mobile device.

Upon detection of one or more of these events, the code in the mobile device 102 executes the following steps (as shown in FIG. 5):

1) Retrieve (502) the DeviceID for the mobile device 102 by calling the appropriate mobile device API; for instance, on Apple's iOS™ this can be done by accessing the shared instance of the ASIdentifierManager class. If the retrieved DeviceID is null, meaning that Device ID sharing has been turned off, do nothing; otherwise continue to the next step.

2) Retrieve (504) the TID for the mobile device 102 by using one of the methods described above. If the TID cannot be retrieved, do nothing; otherwise continue to the next step. In an alternate implementation, the TID is retrieved directly by the service endpoint 106 when it is called in step 506.

3) Call (506) the service endpoint 106 with arguments (TID, DeviceID). The result of the call is ignored; as part of processing the call, the service endpoint 106 updates its mapping as described above.

2) Mapping Via in-App Advertisements

Figure 6:
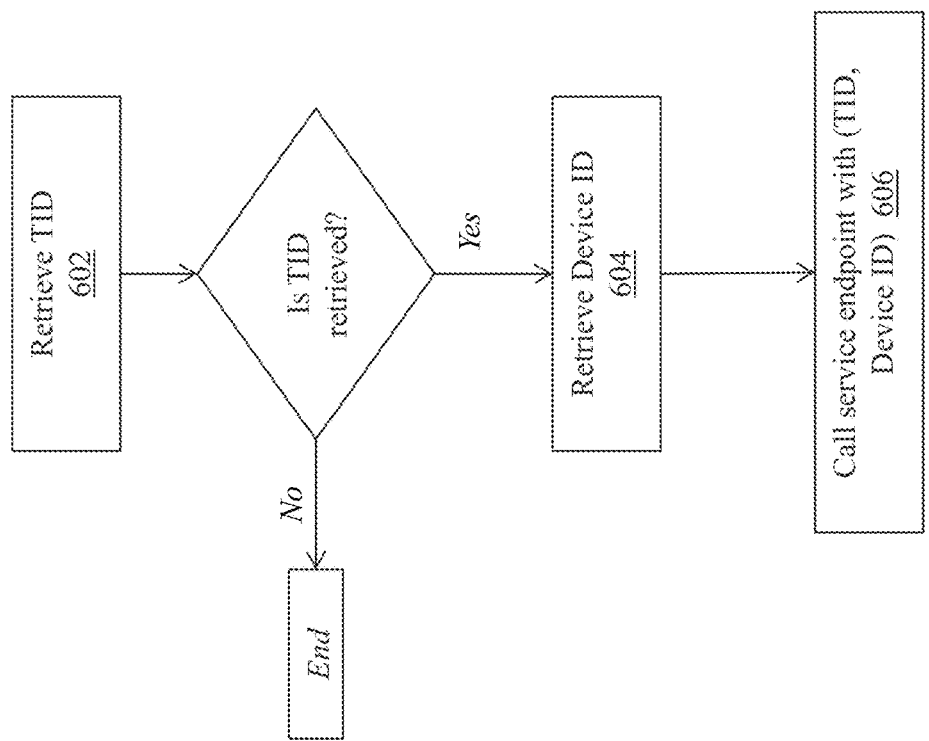
FIG. 6 is a flow diagram of a method of mapping the TID and the DeviceID via in-app advertisements on the mobile device.

In another instance, the service endpoint 106 has access to ad system 110 and can leverage displaying in-app advertisements in the native application 103*a* on the mobile device 102 to set and update the <TID, DeviceID> mapping. This approach is performed by buying an ad impression in-app, either through a real-time bidding platform (RTB) 112 or via direct in-app inventory in the native application 103*a*. The ad impression served by, e.g., ad system 110 contains Javascript instrumentation that implements the following functionality when the advertisement is displayed in the native application 103*a* (as shown in FIG. 6):

1) Retrieve (602) the TID for the mobile device 102 by using one of the methods described above. If the TID cannot be retrieved, do nothing; otherwise, continue to the next step.

2) Retrieve (604) the Device ID for the mobile device 102. Because ads displayed in the native application 103*a* typically contain HTML and Javascript, the native application 103*a* may use an instance of the browser application 103*b* to render ads; as such, the DeviceID cannot be retrieved directly from within the instance of the browser application 103*b*, but needs to be passed as part of the Javascript code or URL of the advertisement, and extracted by the Javascript code of the ad.

3) Call (606) the service endpoint 106 with arguments (TID, DeviceID), from the Javascript code of the ad. The result of the call is ignored; as part of processing the call, the service endpoint updates its mapping as described above.

In one implementation, the ad impression is bought in the normal course of targeting the user of the mobile device 102 (via the Device ID) as part of an advertisement campaign. For instance, ad system 110 may have detected previous in-app activity on the mobile device 102 and may decide to show an advertisement to the user of that device.

Figure 7:
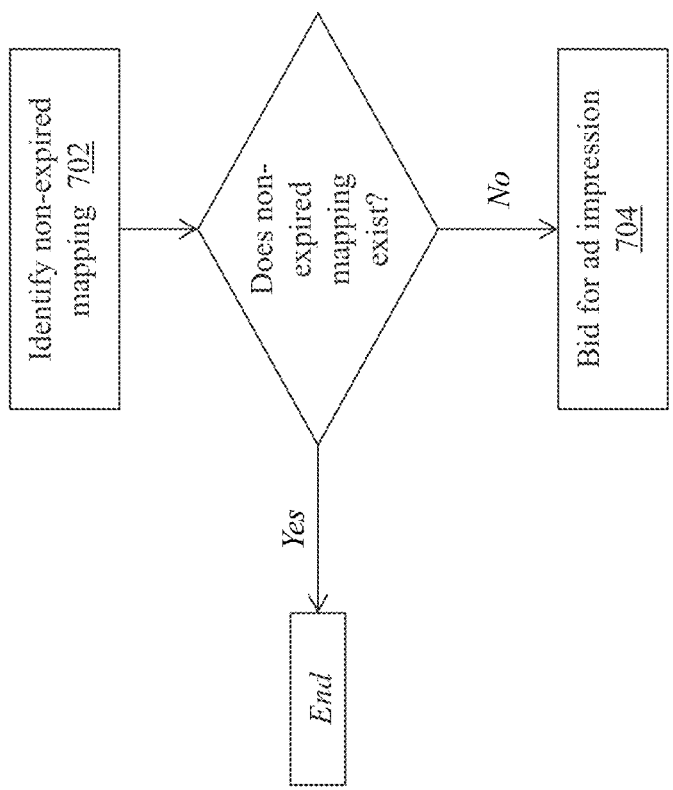
FIG. 7 is a flow diagram of a method of buying an ad impression based on whether a non-expired mapping exists in the mapping table for a given DeviceID.

In an alternative implementation, the ad impression is bought based on whether a non-expired mapping exists in the mapping table containing the given DeviceID. When a display opportunity is detected for a native application 103*a* running on the mobile device 102 with this Device ID, the following steps are performed (as shown in FIG. 7):

1) Identify (702) whether a non-expired mapping exists. If a non-expired mapping <TID, DeviceID> exists in the mapping table, do nothing; otherwise continue to the next step.

2) Bid (704) for the ad impression. In some embodiments, the bid is placed in response to a bid request sent by RTB platform 112, where said bid request contains the DeviceID. In some embodiments, the bid price is determined by ad system 110. In one implementation, the bid price is the floor price for the ad impression opportunity.

In an alternative implementation, an ad impression is bought whenever the IP address on which the DeviceID is seen in a bid request differs from the one on which it was seen last in another bid request; in this case, the IP address needs to be included in the mapping <TID, DeviceID, IP> stored in database 114. A change of IP address may be an indication that the device TID has changed, and the mapping needs to be updated.

3) Mapping Via in-App Pixels

In another instance, the system 100 can create the mapping between TID and Device ID using pixels called from a native application 103*a* installed on the mobile device 102.

For example, several companies that provide in-app SDKs may inject impression pixels. These impression pixels are generally configured by the publisher in the ad server UI and do not need any SDK update. The pixels can be called with the Device ID as a parameter by using the corresponding macro that is provided by the in-app ad server; for instance, on the Google™ SDK, the DeviceID can be obtained via the %% ADVERTISING_IDENTIFIER_PLAIN %% macro.

One or more ad server UIs can therefore be used to inject an impression pixel that calls a pixel corresponding to a service endpoint 106:

tidassociate.stableid.com

The service endpoint 106 computes the TID (for instance, using one of the methods described above) and associates it to the Device ID by updating its mapping as described above. The tidassociate API functionality is the composition of one of the tidxxx endpoints described above (e.g., tidtsval) and the associate endpoint described above:

tidassociate: (DeviceID)→DeviceID'

The system 100 can perform the computation of the TID using any of the approaches previously described herein.

Using the Stable Device Identifier in the Mobile Browser

Turning back to FIG. 2, after the TID has been generated and mapped to a stable identifier (i.e., Device ID) as described above (202), the browser application 103b of the mobile device 102 can retrieve the stable identifier during rendering (204) of a webpage using at least one call to a service endpoint 106. The browser application 103b can then use the retrieved stable identifier to, e.g., store it as a locally-stored value (e.g., by dropping first-party cookies, or third-party cookies), include the identifier in browser-based bid requests, and the like—as will be described in greater detail below.

Figure 8:
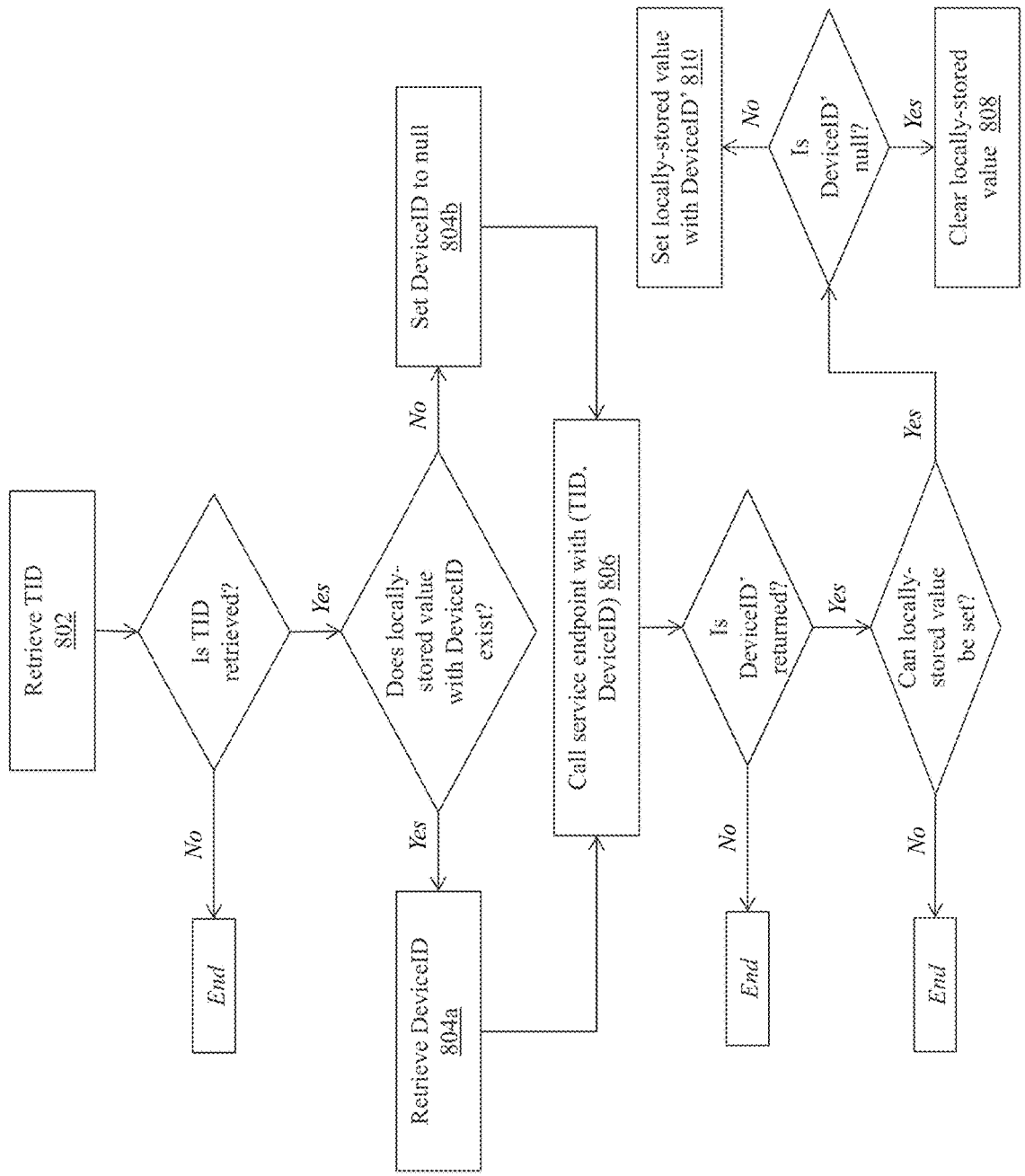
FIG. 8 is a flow diagram of a method of obtaining the stable identifier for the mobile device for use in a mobile browser application.

To obtain the stable identifier for the mobile device 102, upon rendering a web page, the browser application 103b executes in the web page Javascript code that performs the following (as shown in FIG. 8):

1) Retrieve (802) the TID by using one of the methods described above. If the TID cannot be retrieved, do nothing; otherwise, continue to the next step. In an alternate implementation, the TID can be retrieved by the service endpoint 106 when the service endpoint 106 is called in step 806, and the TID does not need to be explicitly retrieved by the Javascript code.

2) If a locally-stored value (such as a first-party cookie) containing the DeviceID exists on the current domain of the web page, retrieve (804a) the DeviceID; otherwise, set (804b) DeviceID to null. Types of locally-stored values can include, but are not limited to: a first-party cookie, a third-party cookie, a partitioned third-party cookie, a browser cache, a partitioned browser cache, or local storage.

3) Call (806) the service endpoint 106 with arguments (TID, DeviceID). If no result can be retrieved by the service endpoint 106, do nothing. Otherwise, assume the result is DeviceID'.

4) If a locally-stored value can be set; if DeviceID'==null, clear (808) any existing locally-stored value containing a DeviceID; otherwise, set (810) the locally-stored value containing DeviceID'.

Note that the above example code stores the DeviceID as a locally-stored value for all domains on which the Javascript is executed. Initially, no such locally-stored values exist for these domains, but as the initial mapping between TID and DeviceID is established, it is stored in such a locally-stored value. This means that in one embodiment, on subsequent visits to this domain, the DeviceID contained in the locally-stored value can be used to establish a mapping with the TID when the service endpoint is called, as described above.

In some cases, the service endpoint 106 may return a DeviceID' that is different from the DeviceID contained in the locally-stored value. This may happen if there was a collision on a TID previously, which resulted in the wrong DeviceID being stored in the locally-stored value. The service endpoint 106 decides which DeviceID is authoritative and forces an update of the locally-stored value. In one implementation, this decision may be based at least in part on a timestamp.

Also, it should be appreciated that the Javascript code described above can be included as part of a tag on retailer, brand, or publisher pages.

1) Using the Stable Identifier to Bid for Mobile Browser Impressions

Ad inventory available on pages rendered by the browser application 103b can be sold via the RTB platform 112 that is connected to ad system 110. For example, ad system 110 can use the user identity passed in a bid request by the RTB platform 112 to decide whether, and how much, to bid for an impression based on the value of that user.

In some embodiments, the user identity is either specific to the RTB platform 112, or to ad system 110, if a mapping (e.g., a cookie sync) has been established previously between ad system 110 and the RTB platform 112. Normally, the RTB platform 112 stores this identity as a cookie on its own RTB domain, i.e. a third-party cookie relative to the domain of the web server 108.

Figure 9:
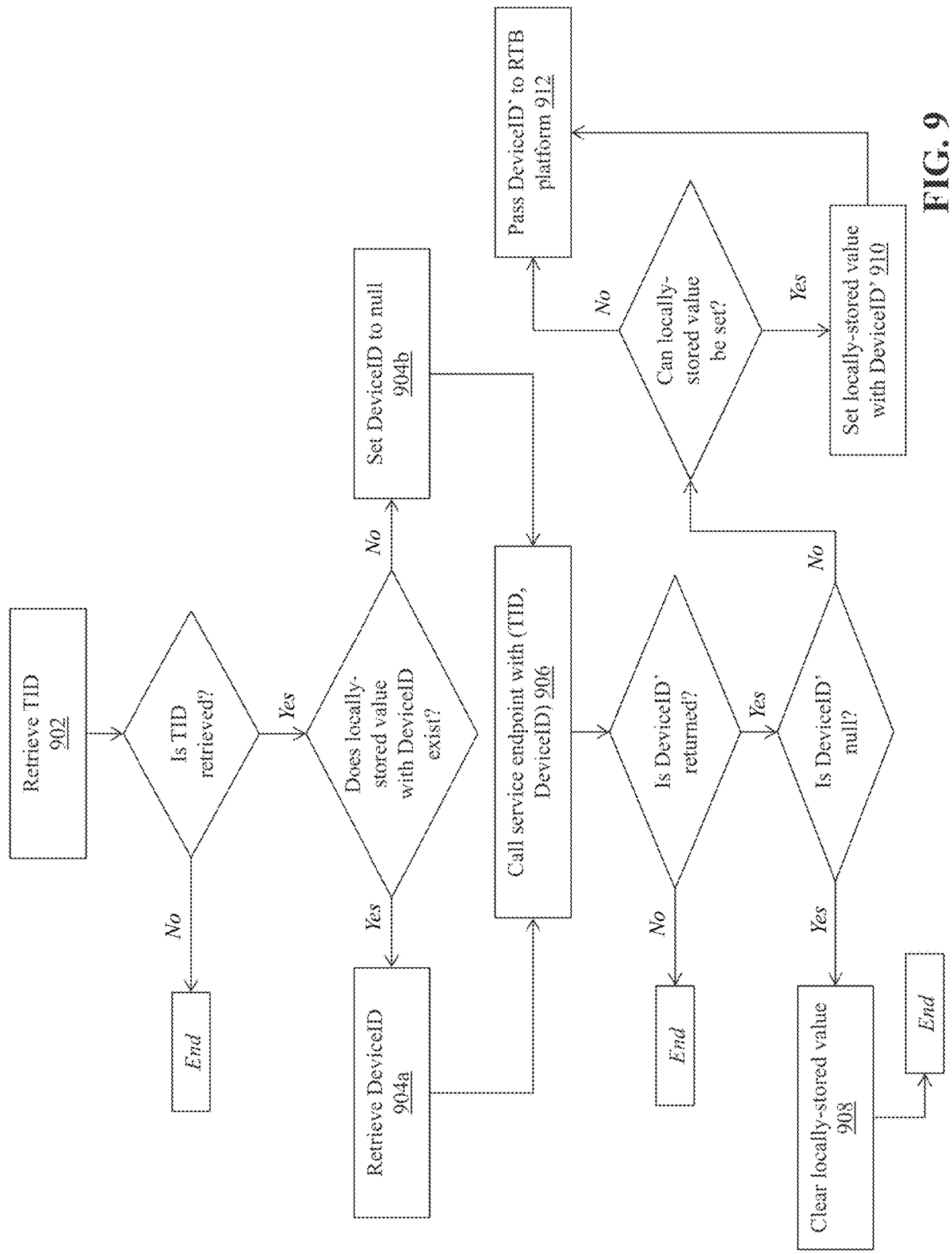
FIG. 9 is a flow diagram of a method of using the stable identifier to bid for ad impressions in a mobile browser application.

However, as mentioned previously, with the ITP functionality in place on Apple's iOS™, RTB domains associated with RTB platforms may be classified as 'trackers' and as such, the RTB platform 112 may not be able to store the user identity in a third-party cookie. To overcome this drawback, the system 100 can include Javascript code as part of an ad impression opportunity that is executed by the mobile browser application 103a and performs the following (as shown in FIG. 9):

1) Retrieve (902) the TID by using one of the methods described above. If the TID cannot be retrieved, do nothing; otherwise, continue to the next step. In an alternate implementation, the TID can be retrieved by the service endpoint 106 when the service endpoint 106 is called in step 906, and the TID does not need to be explicitly retrieved by the Javascript code.

2) If a locally-stored value containing the DeviceID exists for the current domain of the web page containing the ad impression (e.g., the domain of the web server 108), retrieve (904a) the DeviceID from the locally-stored value; otherwise, set (904b) the DeviceID to null.

3) Call (906) the service endpoint 106 with arguments (TID, DeviceID). If no result is retrieved, do nothing. Otherwise, assume the result is DeviceID'.

4) If DeviceID' is null, clear (908) any locally-stored values and continue with step 6 below; if DeviceID' is not null, continue to the next step.

5) If a first-party locally-stored value can be set for the current domain of the web page containing the ad impression, set (910) the locally-stored value containing DeviceID' and continue to the next step; otherwise, do nothing and continue to the next step.

6) Pass (912) the DeviceID' to the RTB platform 112. In turn, the RTB platform 112 may pass the DeviceID' as part of the bid request, to ad system 110.

This approach allows ad system 110 to receive the Device ID and bid smartly, for domains on which the Device ID can be retrieved.

In an alternate implementation, the DeviceID is only passed to the RTB platform 112 if a locally-stored value has been set previously (without calling the service endpoint 106), thus the following steps are executed:

1) If a locally-stored value containing the DeviceID exists for the current domain of the page containing the impression, retrieve the DeviceID; otherwise, set DeviceID to null.

2) Pass the DeviceID to the RTB platform 112. In turn, the RTB platform 112 may pass the DeviceID as part of the bid requests, to ad system 110.

2) Protecting User Privacy

In one implementation, the content of the locally-stored value is the DeviceID itself However, because third parties may be able to access and use the locally-stored values, it is important to protect user privacy and prevent such use by third parties. In an alternate implementation, the locally-stored value does not contain the DeviceID itself, but a value derived from it—called a Secure Identifier (SID). The generation of a SID is described below.

In this example, the system uses a secret symmetric encryption key (KS) held by the service endpoint 106. The system can generate a secure identifier from a DeviceID as follows:

$$SID=\{timestamp, salt, DeviceID\}|_{KS}$$

i.e. the SID is the encrypted value of the concatenation of the current time (timestamp), a random salt of sufficient cardinality (for instance, a 256-bit salt), and the DeviceID.

A SID can be decrypted by the service endpoint 106, using KS, to retrieve the timestamp and the DeviceID. The salt is discarded after decryption.

In addition to the service endpoint 106 functionality described previously, the service endpoint 106 provides a second API that is called from mobile browsers 103b on, e.g., the following domain:

secureassociate.stableid.com

The signature of this API is similar to that of the associate API, with the difference that SIDs are passed and returned instead of 'plaintext' DeviceIDs; namely:

secureassociate: (TID, SID)→SID'

Using the secureassociate API, the browser application 103b sets or obtains the SID' corresponding to the current TID—similar to the approach described above. In this instance, the SID' is stored in the locally-stored value, and rotates—or changes—due to different timestamps used to generate it, every time secureassociate is called. The SID does not divulge the underlying Device ID and is unusable by third-parties, because the timestamp and random salt cause the SID to rotate on each call and help thwart brute-force attacks.

In one implementation, the SID is passed to the RTB platform 112 as part of an ad impression opportunity, as described above; the RTB platform passes the SID as part of its bid request to ad system 110; and ad system 110, sharing the key KS with the service endpoint 106, can decrypt the SID to extract the Device ID.

In one embodiment, the key KS is stored in database 114; in one embodiment, KS can be accessed by the service endpoint 106, and ad system 110.

Implementing a Unified Opt-Out Mechanism Across Mobile Applications and Browsers Based upon the above-described techniques for generating a TID, mapping the TID to a stable device identifier, and using the stable identifier in mobile browser applications 103b, the system 100 can implement an advantageous unified opt-out mechanism for both native mobile applications 103a and mobile browsers 103b using the Device ID sharing functionality of the mobile device 102 currently used only for opting out of native app advertisements. The mobile browser opt-out mechanism described herein takes effect eventually, after a maximum time (e.g., 48 hours or 72 hours) has elapsed since the Device ID sharing has been turned off or disabled on the mobile device 102.

To achieve the unified opt-out mechanism, the service endpoint 106 and ad system 110 maintain a second mapping of 'last seen' times for each DeviceID, as follows:

lastseen: DeviceID→timestamp

In one embodiment, the second mapping is stored in database 114; in one embodiment, the second mapping can be accessed and updated by the service endpoint 106 and ad system 110.

The receiving of the DeviceID by ad system 110 in an in-app RTB bid request issued by the RTB platform 112, or by the service endpoint 106 in an associate or secureassociate API call initiated from a native application 103a, using one of the methods described above, is a reliable indication that Device ID sharing has not been disabled on the mobile device 102. In these cases, ad system 110 or the service endpoint 106, respectively, updates the timestamp in the lastseen mapping for the DeviceID to the current time. The lastseen mapping entry is set to expire after a maximum time (for instance, 48 hours or 72 hours).

If the user disables DeviceID sharing on his or her mobile device 102, the lastseen mapping table will not contain a valid mapping for the DeviceID after the maximum time, because any such mapping (if it existed before) is now expired; the mapping will not be renewed until after the user re-enables Device ID sharing on his or her mobile device 102, because the mobile device 102 stops transmitting the DeviceID until such event.

When a mobile browser ad display opportunity is seen, ad system 110 or service endpoint 106 checks whether a lastseen mapping exists for the DeviceID (or SID, as described above) passed as part of the ad display opportunity (for a direct publisher relationship) or the RTB bid request issued by RTB platform 112. If a SID is passed, it is first decrypted as described above to extract the DeviceID. If no mapping exists in the lastseen second mapping table, or an expired mapping exists, this means that the DeviceID has not been seen recently and it is likely the user has opted out by disabling the DeviceID sharing on the mobile device 102. In that case, ad system 110 does not make a bid for the underlying ad impression, and thus the user is not subsequently targeted or retargeted.

In one embodiment, opt-out can be reverted when the user re-enables Device ID sharing on his or her mobile device 102. Following this re-enabling, the DeviceID will eventually be seen in an in-app RTB bid request sent by the RTB platform 112 or in an associate or secureassociate API call initiated from a native app 103a; the second mapping will be updated; and the user can again be targeted or retargeted.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more specialized processors executing a computer program to perform functions by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A system for opting out of ad retargeting in a browser application of a mobile device, the system comprising a browser application of a mobile device that renders a webpage, the webpage comprising first instructions, executed by the browser application, to:
retrieve a stable identifier of the mobile device;
determine, based upon the retrieved stable identifier, whether sharing of a device identifier is disabled in the mobile device, including calling a service endpoint to check a mapping between the stable identifier and a timestamp; and
identify the mobile device to an ad server or a real-time bidding (RTB) platform based on the retrieved stable identifier, as part of a bid request associated with at least one ad impression, when sharing of the device identifier is not disabled in the mobile device, including:
generating, by the browser application or a native application installed on the mobile device, the bid request associated with the at least one ad impression and transmitting the bid request to the ad server or the RTB platform,
processing, by the ad server or the RTB platform, the bid request and sending the bid request to at least one remote computing device, and
extracting, by the at least one remote computing device, the stable identifier from the bid request and updating the mapping between the stable identifier and the timestamp with the current time.

2. The system of claim 1, wherein the stable identifier and the device identifier are the same.

3. The system of claim 1, wherein the stable identifier is an iOS™ IDFA.

4. The system of claim 1, wherein the stable identifier is an Android™ AAID.

5. The system of claim 1, wherein retrieving a stable identifier of the mobile device comprises retrieving the stable identifier from a locally-stored value.

6. The system of claim 1, wherein when sharing of the device identifier is disabled in the mobile device, retrieving a stable identifier of a mobile device returns a null value for the stable identifier of the mobile device.

7. The system of claim 1, wherein when sharing of the device identifier is disabled in the mobile device, the mobile device clears a locally-stored value that includes the stable identifier of the mobile device.

8. The system of claim 7, wherein the locally-stored value is in one or more of: a first-party cookie, a third-party cookie, a partitioned third-party cookie, a browser cache, a partitioned browser cache, or local storage.

9. The system of claim 1, wherein retrieving a stable identifier of the mobile device comprises retrieving the stable identifier using at least one call to a service endpoint coupled to the mobile device via a communications network.

10. The system of claim 9, wherein retrieving a stable identifier of the mobile device using at least one call to a service endpoint comprises:
generating, by the service endpoint, a transient identifier for the mobile device;
determining, by the service endpoint, the stable identifier of the mobile device by using a mapping between the transient identifier and the stable identifier;
determining, by the service endpoint, whether sharing of the device identifier is disabled in the mobile device by using the mapping between the stable identifier and the timestamp; and
if sharing of the device identifier in the mobile device is disabled, returning a null value for the stable identifier from the at least one call to a service endpoint.

11. The system of claim 10, wherein sharing of the device identifier is determined to be disabled in the mobile device when the timestamp, in the second mapping between the stable identifier and a timestamp, is older than a defined time period.

12. The system of claim 11, wherein the defined time period is 24 hours, 48 hours, or 72 hours.

13. The system of claim 11, wherein the browser application or the native application installed on the mobile device:
generates a request to the service endpoint, the request comprising the stable identifier of the mobile device;
wherein the service endpoint extracts the stable identifier from the request; and
and updates the second mapping between the stable identifier and the timestamp with the current time.

14. A computerized method of opting out of ad retargeting in a browser application of a mobile device, the method comprising:
rendering, by a browser application of a mobile device, a webpage, the webpage comprising first instructions; and
executing, by the browser application, the first instructions to:
retrieve a stable identifier of the mobile device,
determine, based upon the retrieved stable identifier, whether sharing of a device identifier is disabled in the mobile device, including calling a service endpoint to check a mapping between the stable identifier and a timestamp, and
identify the mobile device to an ad server or a real-time bidding (RTB) platform based on the retrieved stable identifier, as part of a bid request associated with at least one ad impression, when sharing of the device identifier is not disabled in the mobile device, including:
generating, by the browser application or a native application installed on the mobile device, the bid request associated with the at least one ad impression and transmitting the bid request to the ad server or the RTB platform,
processing, by the ad server or the RTB platform, the bid request and sending the bid request to at least one remote computing device, and
extracting, by the at least one remote computing device, the stable identifier from the bid request and updating the mapping between the stable identifier and the timestamp with the current time.

15. The method of claim 14, wherein the stable identifier and the device identifier are the same.

16. The method of claim 14, wherein the stable identifier is an iOS™ IDFA.

17. The method of claim 14, wherein the stable identifier is an Android™ AAID.

18. The method of claim 14, wherein retrieving a stable identifier of the mobile device comprises retrieving the stable identifier from a locally-stored value.

19. The method of claim 18, wherein when sharing of the device identifier is disabled in the mobile device, the mobile device clears the locally-stored value that includes the stable identifier of the mobile device.

20. The method of claim 18, wherein the locally-stored value is in one or more of: a first-party cookie, a third-party cookie, a partitioned third-party cookie, a browser cache, a partitioned browser cache, or local storage.

21. The method of claim 14, wherein when sharing of the device identifier is disabled in the mobile device, retrieving a stable identifier of a mobile device returns a null value for the stable identifier of the mobile device.

22. The method of claim 14, wherein retrieving a stable identifier of the mobile device comprises retrieving the stable identifier using at least one call to a service endpoint coupled to the mobile device via a communications network.

23. The method of claim 22, wherein retrieving a stable identifier of the mobile device using at least one call to a service endpoint comprises:
   generating, by the service endpoint, a transient identifier for the mobile device;
   determining, by the service endpoint, the stable identifier of the mobile device by using a first mapping between the transient identifier and the stable identifier;
   determining, by the service endpoint, whether sharing of the device identifier is disabled in the mobile device by using the mapping between the stable identifier and the timestamp; and
   if sharing of the device identifier in the mobile device is disabled, returning a null value for the stable identifier from the at least one call to a service endpoint.

24. The method of claim 14, wherein sharing of the device identifier is determined to be disabled in the mobile device when the timestamp, in the mapping between the stable identifier and a timestamp, is older than a defined time period.

25. The method of claim 24, wherein the defined time period is 24 hours, 48 hours, or 72 hours.

26. The method of claim 14, wherein the browser application or the native application installed on the mobile device:
   generates a request to the service endpoint remote computing device, the request comprising the stable identifier of the mobile device;
   wherein the service endpoint extracts the stable identifier from the request
   and updates the mapping between the stable identifier and the timestamp with the current time.

* * * * *